United States Patent
Sridhara et al.

(10) Patent No.: US 11,726,778 B2
(45) Date of Patent: Aug. 15, 2023

(54) TRANSLATING CLUSTERS OF A MONOLITH APPLICATION TO MICROSERVICES

(71) Applicant: International Business Machines Corporation, Armonk, NY (US)

(72) Inventors: Giriprasad Sridhara, Bangalore (IN); Srikanth Govindaraj Tamilselvam, Chennai (IN); Shivali Agarwal, Ghaziabad (IN)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 17/489,280

(22) Filed: Sep. 29, 2021

(65) Prior Publication Data

US 2023/0094887 A1 Mar. 30, 2023

(51) Int. Cl.
*G06F 8/72* (2018.01)
*G06F 9/54* (2006.01)
*G06F 8/75* (2018.01)

(52) U.S. Cl.
CPC .............. *G06F 8/72* (2013.01); *G06F 8/75* (2013.01); *G06F 9/547* (2013.01)

(58) Field of Classification Search
CPC .............. G06F 8/75; G06F 8/72; G06F 9/547
See application file for complete search history.

(56) References Cited

U.S. PATENT DOCUMENTS 10,430,250 B2 10/2019 Ishikawa et al.
10,637,952 B1 4/2020 Koenig et al.
(Continued)

FOREIGN PATENT DOCUMENTS

CN 109948710 6/2019
CN 112398899 2/2021
(Continued)

OTHER PUBLICATIONS

Alexander Krause, "Microservice Decomposition via Static and Dynamic Analysis of the Monolith", May 19, 2020 IEEE (Year: 2020).*

(Continued)

*Primary Examiner* — Qing Chen
*Assistant Examiner* — Amir Soltanzadeh
(74) *Attorney, Agent, or Firm* — Ryan, Mason & Lewis, LLP

(57) ABSTRACT

Methods, systems, and computer program products for translating clusters of a monolith application to microservices are provided herein. A computer-implemented method includes obtaining a plurality of candidate microservices for refactoring a monolith application, each candidate microservice including one or more of a plurality of software classes of the monolith application; analyzing the monolith application to identify one or more software functions in the plurality of software classes to expose as one or more application programming interfaces; automatically isolating non-overlapping software functions of the monolith application between the plurality of candidate microservices; converting source code corresponding to the identified one or more software functions into a standardized application programming interface format based at least in part on the isolating; and using the converted source code to generate a plurality of deployable microservices corresponding to the plurality of candidate microservices.

20 Claims, 10 Drawing Sheets

(56) References Cited

U.S. PATENT DOCUMENTS

| | | | |
|---|---|---|---|
| 10,936,291 | B1 | 3/2021 | Gamliel et al. |
| 11,467,826 | B1* | 10/2022 | Chawda .................. G06F 8/433 |
| 2003/0005258 | A1 | 1/2003 | Modha et al. |
| 2017/0187785 | A1 | 6/2017 | Johnson et al. |
| 2017/0364434 | A1 | 12/2017 | Kairali et al. |
| 2018/0365008 | A1 | 12/2018 | Chandramouli et al. |
| 2019/0108067 | A1 | 4/2019 | Ishikawa et al. |
| 2019/0116047 | A1 | 4/2019 | Struttmann et al. |
| 2019/0138428 | A1 | 5/2019 | Sumitomo et al. |
| 2019/0250912 | A1 | 8/2019 | Gavisiddappa Kodigenahalli et al. |
| 2019/0279038 | A1 | 9/2019 | Nicol |
| 2019/0361686 | A1 | 11/2019 | Gnazdowsky et al. |
| 2020/0042315 | A1 | 2/2020 | Gupta |
| 2020/0042328 | A1 | 2/2020 | Gupta |
| 2020/0097390 | A1* | 3/2020 | Gunter ................ G06F 11/3684 |
| 2020/0160121 | A1 | 5/2020 | Parasrampuria et al. |
| 2020/0192690 | A1* | 6/2020 | Gupta .................. G06F 9/5077 |
| 2020/0218634 | A1 | 7/2020 | Jones et al. |
| 2020/0401386 | A1 | 12/2020 | Punathil et al. |
| 2021/0011688 | A1 | 1/2021 | Sasidharan et al. |
| 2021/0124577 | A1 | 4/2021 | Gupta |
| 2021/0232390 | A1 | 7/2021 | Hwang et al. |
| 2022/0060431 | A1* | 2/2022 | Vadayadiyil Raveendran ............ H04L 41/12 |
| 2022/0188104 | A1* | 6/2022 | Wan .................. G06F 16/24526 |
| 2022/0301173 | A1 | 9/2022 | Cheng et al. |

FOREIGN PATENT DOCUMENTS

| | | |
|---|---|---|
| CN | 113204465 | 8/2021 |
| WO | 2019209231 A2 | 10/2018 |
| WO | 2021064058 A1 | 4/2021 |

OTHER PUBLICATIONS

Mell, Peter, et al., The NIST Definition of Cloud Computing, National Institute of Standards and Technology, U.S. Department of Commerce, NIST Special Publication 800-145, Sep. 2011.

IBM: List of IBM Patents or Patent Applications Treated as Related, Dec. 16, 2021, pp. 1-2.

Desai, Utkarsh Milind et al., Pending U.S. Appl. No. 17/543,312, filed Dec. 6, 2021, titled "Multi-Objective Driven Refactoring of a Monolith Application Using Reinforcement Learning".

Tamilselvam, Srikanth Govindaraj et al., Pending U.S. Appl. No. 17/538,355, filed Nov. 30, 2021, titled "Identifying Microservices for a Monolith Application Through Static Code Analysis".

Tamilselvam, Srikanth Govindaraj et al., Pending U.S. Appl. No. 17/467,690, filed Sep. 7, 2021, titled "Constraints-Based Refactoring of Monolith Applications Through Attributed Graph Embeddings".

Monte Carlo tree search, https://en.wikipedia.org/w/index.php?title=Monte_Carlo_tree_search&oldid=1050627850 (last visited Dec. 6, 2021.

Harms, Holger, Collin Rogowski, and Luigi Lo Iacono. "Guidelines for Adopting Frontend Architectures and Patterns in Microservices-based Systems." Proceedings of the 2017 11th Joint Meeting on Foundations of Software Engineering. 2017.

Amiri, Mohammad Javad. "Object-aware Iidentification of Microservices." 2018 IEEE International Conference on Services Computing (SCC). IEEE, 2018.

Ren, Zhongshan, et al. "Migrating Web Applications from Monolithic Structure to Microservices Architecture." Proceedings of the Tenth Asia-Pacific Symposium on Internetware. 2018.

Jin, Wuxia, et al. "Functionality-oriented Microservice Extraction Based on Execution Trace Clustering." 2018 IEEE International Conference on Web Services (ICWS). IEEE, 2018.

Nunes, Luís, Nuno Santos, and Antönio Rito Silva. "From a Monolith to a Microservices Architecture: An Approach Based on Transactional Contexts." European Conference on Software Architecture. Springer, Cham, 2019.

Baresi, Luciano, Martin Garriga, and Alan De Renzis. "Microservices Identification Through Interface Analysis." European Conference on Service-Oriented and Cloud Computing. Springer, Cham, 2017.

Fritzsch, Jonas, et al. "From monolith to microservices: a classification of refactoring approaches." International Workshop on Software Engineering Aspects of Continuous Development and New Paradigms of Software Production and Deployment. Springer, Cham, 2018.

Desai U, Bandyopadhyay S, Tamilselvam S. Graph neural network to dilute outliers for refactoring monolith application. InProceedings of 35th AAAI Conference on Artificial Intelligence (AAAI'21) Feb. 7, 2021.

Bandyopadhyay S, Lokesh N, Murty MN. Outlier aware network embedding for attributed networks. In Proceedings of the AAAI conference on artificial intelligence Jul. 17, 2019 (vol. 33, No. 01, pp. 12-19).

Mazlami, Gene, Jürgen Cito, and Philipp Leitner. "Extraction of microservices from monolithic software architectures." 2017 IEEE International Conference on Web Services (ICWS). IEEE, 2017.

De Alwis, Adambarage Anuruddha Chathuranga, et al. "Function-splitting heuristics for discovery of microservices in enterprise systems." International Conference on Service-Oriented Computing Springer, Cham, 2018.

System and Method for Cognitive Microservices Recommendations, IP.com Prior Art Database, Nov. 30, 2020.

Diluting Outliers for Refactoring Monolith Application through Attributed Graph Embeddings, IP.com Prior Art Database, Sep. 7, 2020.

System and Method for Identifying Critical Business Cases from a Monolith Application being Modernized with Optimized Business Value, IP.com Prior Art Database, Aug. 16, 2020.

Creating composite UI based on microservices, Microsoft Corporation, https://docs.microsoft.com/en-us/dotnet/architecture/microservices/architect-microservice-container-applications/microservice-based-composite-ui-shape-layout, last accessed Nov. 30, 2021, published Sep. 15, 2021.

Jackson Cam, Micro Frontends, https://martinfowler.com/articles/micro-frontends.html, last accessed Nov. 30, 2021, published Jun. 19, 2019.

Geers, Michael, What are Micro Frontends?, https://micro-frontends.org/, last accessed Nov. 30, 2021.

Gill, Navdeep Singh, Understanding Integration of dot js Frameworks to Micro Frontend, available at https://www.xenonstack.com/blog/js-integration-micro-frontend, last accessed Nov. 30, 2021, published Mar. 21, 2019.

Witkowski, Robert, UI in Microservices World—Micro Frontends pattern and Web Components, available at https://medium.com/@witek1902/ui-in-microservices-world-micro-frontends-pattern-and-web-components-23607a569363, ast accessed Nov. 30, 2021, published Dec. 13, 2018.

What is Micro Frontend and How it Provides Benefits to the Startups?, Techuz InfoWeb Private Limited, https://www.techuz.com/blog/what-is-micro-frontend-and-how-it-provide-benefits-to-the-startups/, last accessed Nov. 30, 2021, published Feb. 28, 2018.

Abdullah, Muhammad et. al., "Unsupervised Learning Approach for Web Application Auto-Decomposition into Microservices", published in Journal of Systems and Software, Feb. 2019.

Chen, Xi, et al. "Meta-learning for multi-objective reinforcement learning." 2019 IEEE/RSJ International Conference on Intelligent Robots and Systems (IROS). IEEE, Oct. 7, 2019.

James, Steven, et al., "An analysis of monte carlo tree search." Thirty-First AAAI Conference on Artificial Intelligence, Feb. 2017.

Jaderberg, Max, et al. "Reinforcement learning with unsupervised auxiliary tasks." arXiv preprint arXiv:1611.05397 Nov. 16, 2016.

Van Moffaert, Kristof, et al. "Multi-objective reinforcement learning using sets of pareto dominating policies." The Journal of Machine Learning Research 15.1, Jan. 1, 2014, pp. 3483-3512.

Liang, Eric, et al. "RLlib: Abstractions for distributed reinforcement learning." International Conference on Machine Learning. PMLR, Jul. 3, 2018.

Yang, Runzhe, et al., "A generalized algorithm for multi-objective reinforcement learning and policy adaptation." arXiv preprint arXiv:1908.08342, Aug. 21, 2019.

(56) References Cited

OTHER PUBLICATIONS

International Search Report and Written Opinion from International Application No. PCT/CN2022/124669, 9 pages, dated Dec. 15, 2022.

* cited by examiner

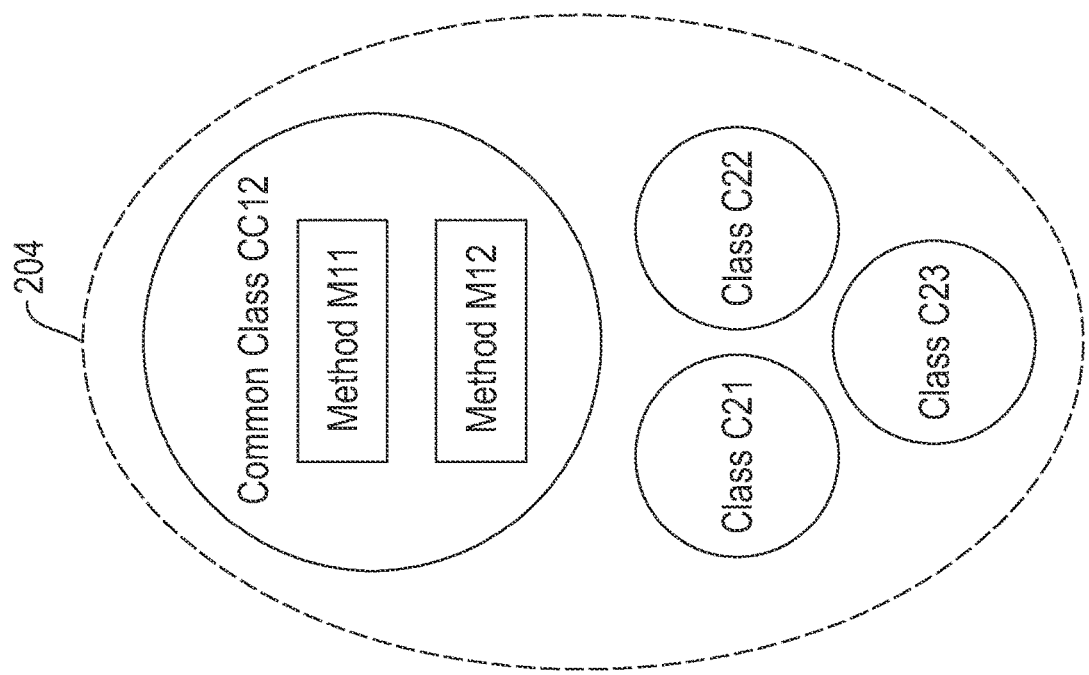
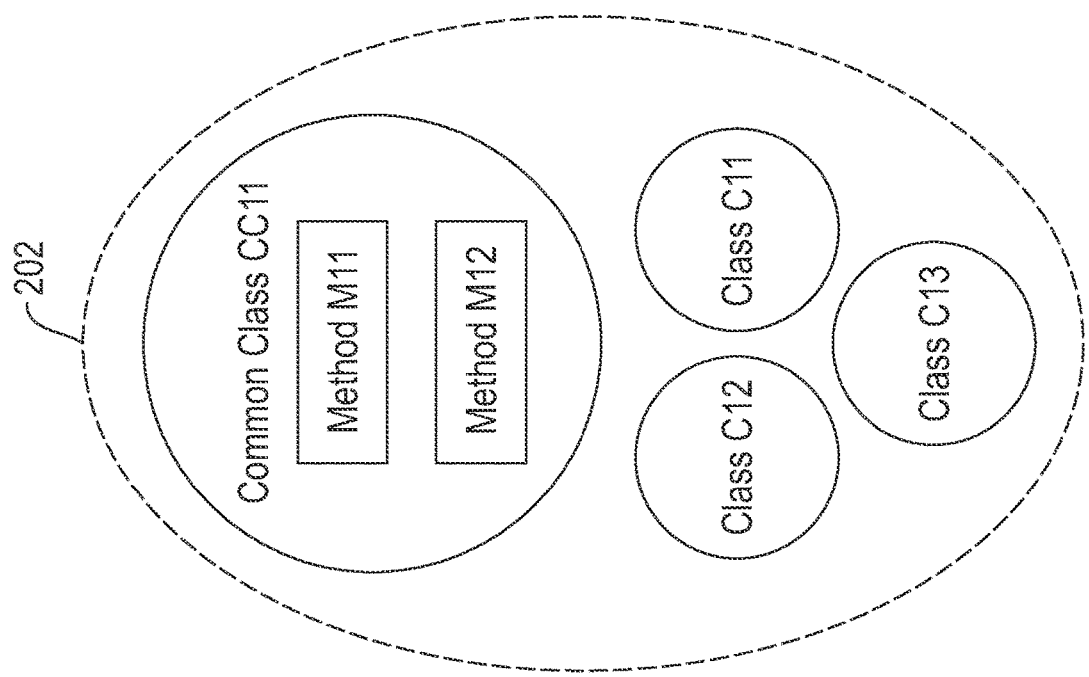
FIG. 2B

```
@WebServlet (name = "TradeAppServlet" . urlPatterns = { "/app" } )          ─300
public class TradeAppServlet extends HttpServlet {
                             ─312  ─302
    @Path("/bookings")
    public class BookingsREST {                                              ─310 private BookingService bs = ServiceLocator . instance()

@POST
        @Consumes ( {"application/x-www-form-urlencoded"}                    ─314
        @Path (" /bookflights")
        @Produces ("text/plain")
        public /*BookingInfo*/ Response bookFlights( <h : commandLink styleClass="trail footer" action="promo" value="Home" />
<h : commandLink styleClass="trail footer" action=#{account.performLogin}
                                                                   ─322
@Named("account")  ─324
@SessionScoped
public class AccountBean implements Serializable {
    . . .
    public String performLogin() {
                        ─326
                                                                        ─320
```

FIG. 3

```
1:
  ▶ service_name:    "com.ibm.websphere.samples.daytrader.ejb3.DTStreamer3MDB.onMessage"    ─ 402
    resource_type:   "queue"
    resource_name:   "TradeStreamerTopic"
    crud:            "R"
2:
  ▶ service_name:    "com.ibm.websphere.samples.daytrader.ejb3.TradeSLSBBean.register"      ─ 404
    resource_type:   "dbtable"
    resource_name:   "accountejb"
    crud:            "C"
3:
  ▶ service_name:    "com.ibm.websphere.samples.daytrader.ejb3.TradeSLSBBean.register"
    resource_type:   "dbtable"
    resource_name:   "accountprofileejb"
    crud:            "R"
4:
  ▶ service_name:    "com.ibm.websphere.samples.daytrader.ejb3.TradeSLSBBean.register"
    resource_type:   "dbtable"
    resource_name:   "accountejb"
    crud:            "U"
```

FIG. 4

TRANSLATING CLUSTERS OF A MONOLITH APPLICATION TO MICROSERVICES

FIELD

The present application generally relates to information technology and, more particularly, to modernizing applications.

BACKGROUND

Organizations are increasingly attempting to refactor monolith application architectures into microservice architectures as part of their journey to the cloud. Generally, refactoring a microservice architecture involves partitioning the software components into finer modules such that development of the modules can happen independently. Microservice architectures provide natural benefits when deployed in the cloud since resources can be allocated dynamically to necessary components based on demand.

SUMMARY

In one embodiment of the present disclosure, techniques for translating clusters of a monolith application to microservices are provided. An exemplary computer-implemented method can include obtaining a plurality of candidate microservices for refactoring a monolith application, each candidate microservice comprising one or more of a plurality of software classes of the monolith application; analyzing the monolith application to identify one or more software functions in the plurality of software classes to expose as one or more application programming interfaces; automatically isolating non-overlapping software functions of the monolith application between the plurality of candidate microservices; converting source code corresponding to the identified one or more software functions into a standardized application programming interface format based at least in part on the isolating; and using the converted source code to generate a plurality of deployable microservices corresponding to the plurality of candidate microservices.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

BRIEF DESCRIPTION OF THE DRAWINGS

FIGS. 2A and 2B are diagrams showing techniques for isolating functional blocks of a monolith application between clusters according to an exemplary embodiment of the present disclosure;

FIG. 3 is a diagram showing techniques for identifying candidate methods to convert into REST APIs according to an exemplary embodiment of the present disclosure;

FIG. 4 is a diagram showing techniques for converting a monolith web API to a REST API according to an exemplary embodiment of the present disclosure;

DETAILED DESCRIPTION

A monolith application generally refers to an application that is built as a single unit. For example, a monolith application may include a database, a client-side user interface, and a server-side application server, where all of the functions are managed and served in one place. Accordingly, monolith applications often have a large and complex code base. Developers making changes or updates to the application must all access the same code base.

In a microservice architecture, the application is broken down into a number of microservices, where each microservice carries out a process of the application. The microservices can communicate with each other via application programming interfaces (APIs). In contrast to monolith architectures, each microservice can be updated or deployed independently.

Application refactoring refers to a process of rewriting one or more components of an application, for example, in order to make the application cloud enabled, or to convert the application from a monolith application to an application that uses a microservice architecture.

Existing techniques related to refactoring include, for example, recommending clusters of application components based on a static and/or dynamic analysis of a monolith application. In general, such techniques fail to generate functionally independent and deployable microservices from the recommended clusters.

As described herein, exemplary embodiments of the present disclosure include techniques for translating clusters of a monolith application to microservices. One or more embodiments include isolating non-overlapping functions (e.g., split interfaces or classes) to appropriate a cluster owner and generating new classes resulting from the function isolation. Also, uniform resource identifiers (URIs) may be generated for each of the clusters. Web APIs of the monolith application are converted to REST APIs. In some example embodiments, types of operations used in methods of the monolith application are detected that are similar to API-type operations (e.g., POST, GET, DELETE), and method arguments are converted to a standardized format (e.g., JSON). Further, some embodiments enable information to be provided to users about data flows in the methods and enable the users to design (e.g., add, remove, or update) new interfaces. Also, object modifications may be detected and sustained in REST APIs. Deployable artifacts for the microservices may be generated in the form of a REST API, for example. Additionally, in some embodiments, a representation of the REST API is also generated, such as in the form of a Swagger document, for example. It is to be appreciated that a Swagger document may be created based on the OpenAPI standard and can help developers understand the design and have discussions about the microservice endpoints (e.g., functionalities).

Figure 1:
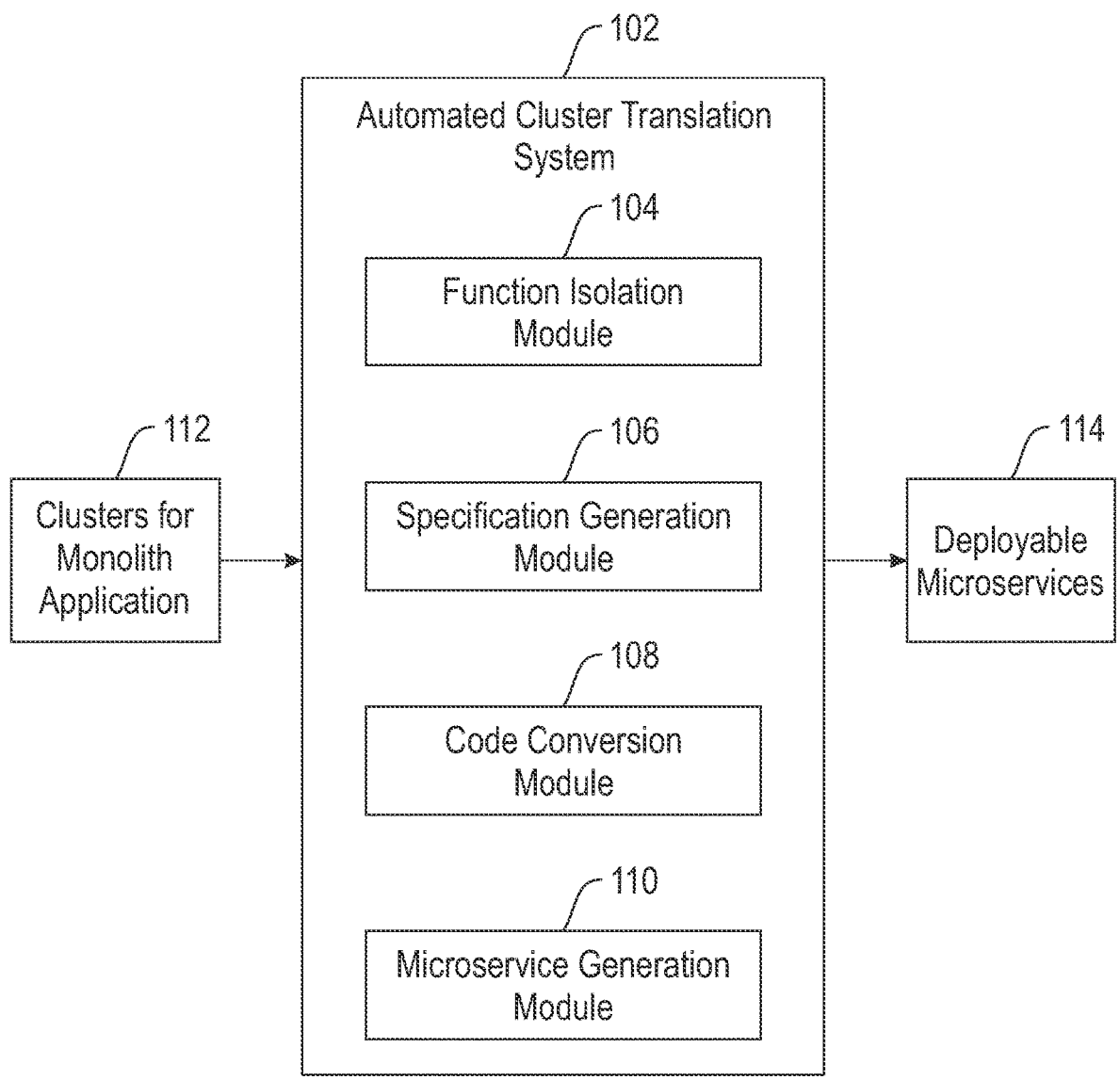
FIG. 1 is a diagram illustrating a system architecture according to an exemplary embodiment of the present disclosure.

FIG. 1 shows a diagram illustrating a system architecture, according to an exemplary embodiment of the present disclosure. The FIG. 1 example includes an automated cluster translation system 102 comprising a function isolation module 104, a specification generation module 106, code conversion module 108, and a microservice generation module 110. The automated cluster translation system 102 obtains a plurality of clusters of a monolith application 112. In some example embodiments, the clusters 112 may be automatically generated by another system or another hardware and/or software component of the automated cluster translation system 102. As an example, the clusters 112 may be generated using at least one of a static and/or dynamic analysis of the monolith application.

The function isolation module 104 isolates non-overlapping functions of the monolith application to respective ones of the clusters 112. For example, the function isolation module 104 may perform at least one of splitting or duplicating functional blocks (e.g., program functions and variables) of a given software class across different ones of the clusters 112. For example, the function isolation module may generate a new class within a given one of the clusters 112 based on the splitting and/or duplicating of the functional blocks.

The specification generation module 106 generates a uniform resource identifier (URI) for entry point functions of the monolith application and functions that are called by programs from other ones of the clusters 112. The URI may be generated using a combination of labels corresponding to the clusters 112 and class names of the monolith application. Additionally, the specification generation module 106 generates an API specification based at least in part on the generated URIs.

The code conversion module 108 converts the functions associated with the generated URIs to one or more APIs, as described in more detail elsewhere herein.

The microservice generation module 110 generates and outputs deployable microservices 114 corresponding to the monolith application. For example, the deployable microservices 114 may be output to a user, or automatically deployed as microservices in a cloud system, for example.

Figure 2A:
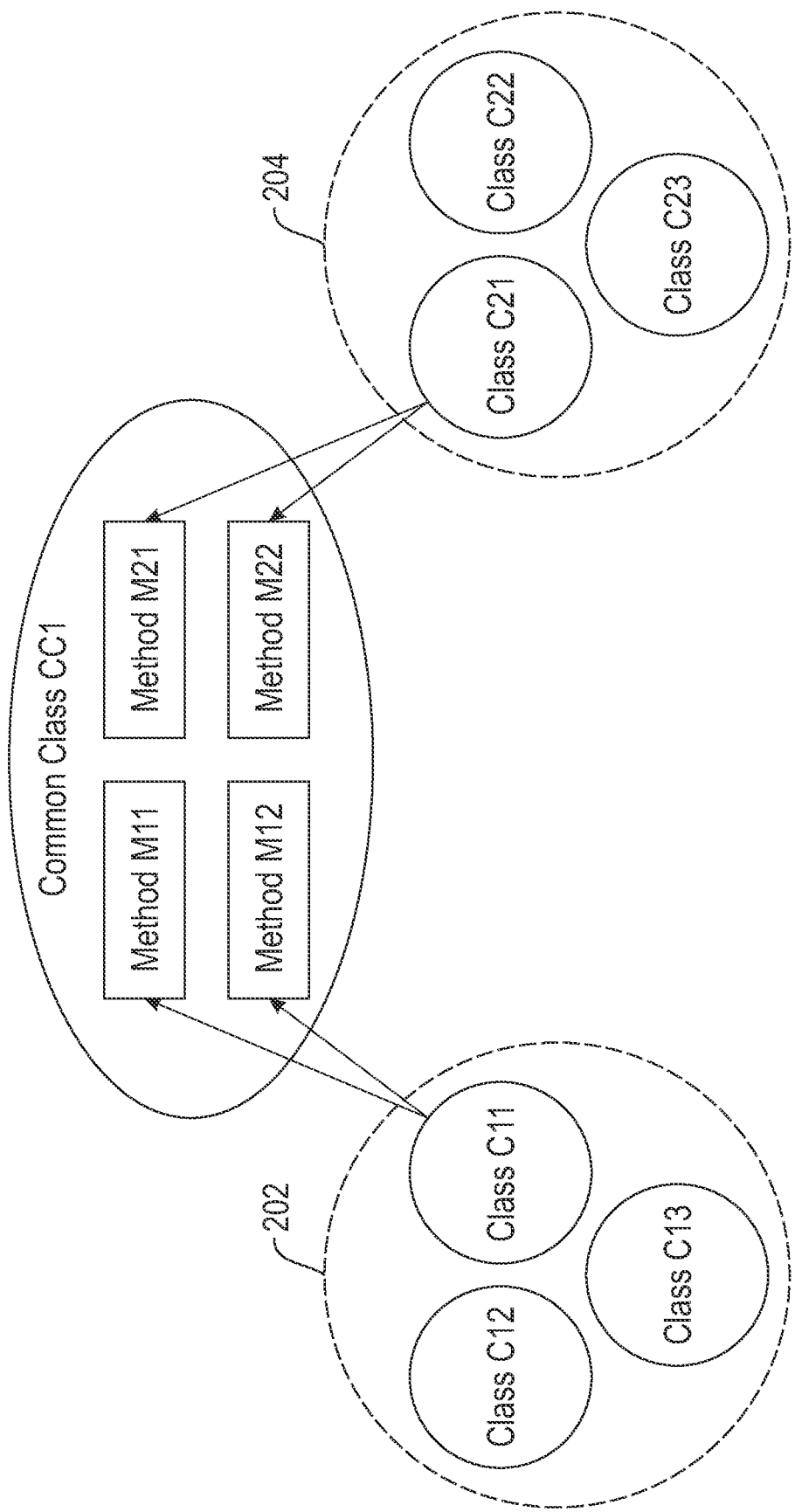

Referring also to FIGS. 2A and 2B, these figures show diagrams for isolating functional blocks of a monolith application between clusters according to an exemplary embodiment of the present disclosure. FIG. 2A shows two candidate clusters 202, 204, each having three classes, namely, C11, C12, and C13 and C21, C22, C23, respectively. The candidate clusters 202 and 204 may correspond to clusters 112 in FIG. 1, for example. Also, it is assumed that each of the clusters are using a common class CC1. Some embodiments include leveraging program analysis to determine if the common class CC1 includes non-overlapping functionalities. For example, the program analysis may automatically determine that class C11 of cluster 202 uses method M11 and method M12 of common class CC1, and class C21 of cluster 204 uses M21 and M22 of common class CC1. The functionality of the common class CC1 should be added to the clusters 202 and 204 so that they compile properly.

FIG. 2B shows an example of adding the non-overlapping functionalities shown in FIG. 2A to the respective clusters 202 and 204. More specially, FIG. 2B shows that class CC1 is split into two new classes CC11 and CC12. For example, static program analysis can again be leveraged to automatically add the functionality of common class CC1 to the proper cluster. In the FIG. 2B example, new class CC11 is added to cluster 202 with methods M11 and M12, and new class CC12 is added to cluster 204 with methods M21 and M22.

In at least one embodiment, transitively, methods that are invoked from M11 of CC1 and M12 of CC2 are added to CC11. Also, if we assume M11 and M12 are using a field, f1, then this field may be included in CC11. Any method in which f1 is assigned to (written) will also be included in CC11. If there is access to common methods or variables, then the common method or variable may be duplicated in both CC11 and CC12.

Some embodiments include converting a monolith web API to a REST (representational state transfer) API. For example, web APIs may be identified statically for common frameworks or may be extracted using a dynamic analysis by looking into the start backend class. It is noted that the first class that is called from a UI (e.g., a html page) is called a start backend class or a service class. Accordingly, the start backend class may be detected through static program analysis or tracing through the application execution logs in a production and/or test environment. Based on this information, candidate methods of the monolith application can be identified to be converted into REST APIs.

Referring also to FIG. 3, this figure illustrates techniques for identifying candidate methods with respect to different code samples. Specifically, FIG. 3 includes a code snippet 300 corresponding to servlet code. Servlet code may be searched to identify servlet classes and service implementations reachable from the servlet code classes, as indicated by box 302 in the code snippet 300. For JAX-RS, a search may be performed for classes and a method with JAX-RS annotations, as indicated by boxes 312 and 314 in code snippet 310. For JSF, service expressions may be extracted from view templates and classes and methods may be found that implement the services, as indicated by boxes 322, 324, and 326 in code snippet 320. As another example, for a Spring Framework, a search can be performed on classes that include "Controller" (e.g., a "@Controller" annotation), and service implementations may be identified from the class. Additionally, REST paths may be reachable from the class, or may be found as service entry names (e.g., "@RequestMapping("/test/")"). For Struts, the struts-config.xml file may be used to identify service implementation and name from action tags, for example.

Referring now to FIG. 4, this figure shows techniques for converting a monolith web API to a REST API according to an exemplary embodiment of the present disclosure. FIG. 4 shows show a snapshot of transaction details for API candidates of a monolith application and the types of operations they perform. Specifically, the API candidates relate to two methods of the monolith application, namely, DTStreamer3MDB.onMessage and TradeSLSBean.register. At least some embodiments determine a type of each of the methods based on a combination of program complexity and transactions. For example, DTStreamer3MDB.onMessage is involved only in READ operations as indicated by the "R" in the crud field of box 402, and TradeSLSBean.register is involved in CREATE, READ, and UPDATE operations, as indicated by the "C", "R", and "U" crud fields of box 404. The type of each of the two methods can be determined based on the information shown in boxes 402, 404, which can then be mapped to candidate types of REST API operations. For example, DTStreamer3MDB.onMessage can be mapped to a GET operation as it involves only READ operations. TradeSLSBean.register involves CREATE, READ, and UPDATE, and so it can be split into POST, GET, and PUT methods, respectively.

Alternatively, or additionally, the method type may also be determined by performing a natural language programming (NLP) analysis on the signature of the method. For example, the analysis can identify that an HTTP GET is a candidate for a method having a signature that includes "readData", and an HTTP POST is a candidate for a method having a signature that includes "updateData." It is to be appreciated that such an analysis may also be performed on statements in the method to extract such information.

Figure 5:
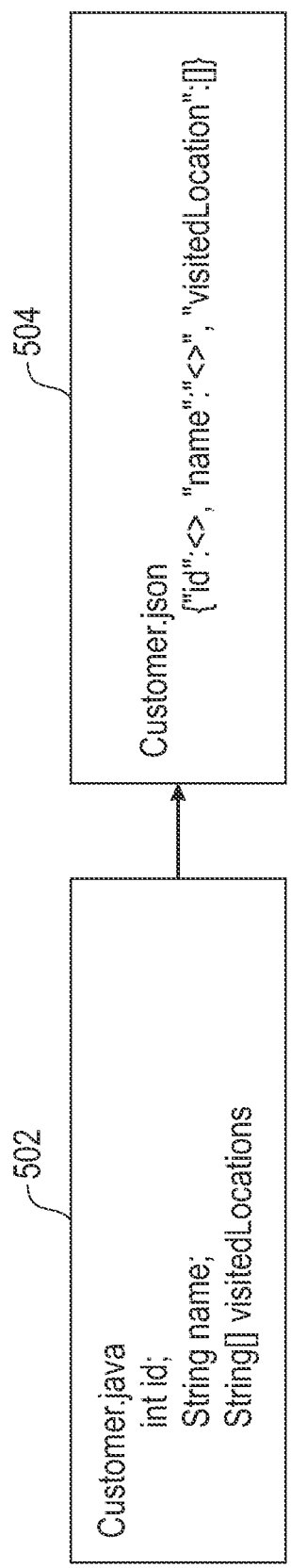
FIG. 5 is a diagram showing techniques for converting method arguments to a standardized format according to an exemplary embodiment of the present disclosure.

Referring now to FIG. 5, this figure shows techniques for converting method arguments to a standardized format according to an exemplary embodiment of the present disclosure. FIG. 5 shows an example of a method argument corresponding to customer java object 502, which includes an integer ("id"), a string ("name"), and a string array ("visitedLocations"). The java customer object may be converted into a standardized REST data format 504. In some embodiments, non-primitive data (e.g., object 502) that is passed as method arguments is detected, and the non-primitive data is converted into a JSON format, for example. In the FIG. 5 example, the standardized format 504 is a JSONObject structure. Converting the method argument may include performing a data flow analysist that detects all modifications to the non-primitive data, and such modifications may then be captured and updated to the replaced JSON.

A representation of the REST API (e.g., a Swagger document), in at least some embodiments, is created by generating API signatures for the converted monolith application methods. As an example, the Swagger document may include the API signatures and can be provided to a tool (such as, a Spring Boot framework or JAX-RS, for example) to automatically generate deployable build artifacts.

Accordingly, at least some of the embodiments described herein provide an efficient process for generating microservice code without the need of additional resources (e.g., a file or table) to track the object state.

Figure 6:
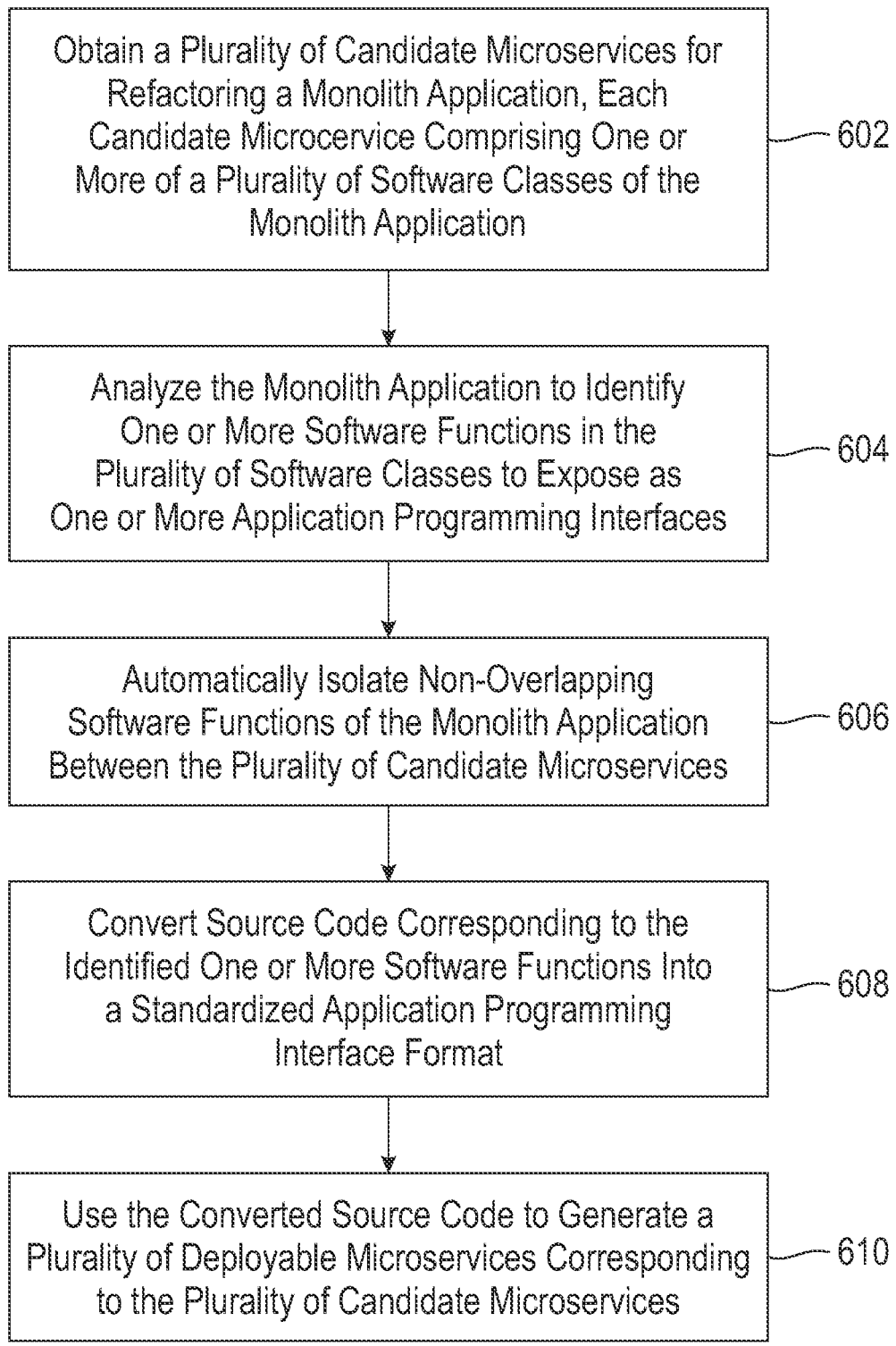
FIG. 6 is a flow diagram illustrating techniques translating clusters of a monolith application to microservices according to an embodiment of the present disclosure.

FIG. 6 is a flow diagram illustrating techniques for translating clusters of a monolith application to microservices according to an embodiment of the present disclosure.

Step 602 includes obtaining a plurality of candidate microservices for refactoring a monolith application, each candidate microservice comprising one or more of a plurality of software classes of the monolith application. Step 604 includes analyzing the monolith application to identify one or more software functions in the plurality of software classes to expose as one or more application programming interfaces. Step 606 includes automatically isolating non-overlapping software functions of the monolith application between the plurality of candidate microservices. Step 608 includes converting source code corresponding to the identified one or more software functions into a standardized application programming interface format based at least in part on the isolating. Step 610 includes using the converted source code to generate a plurality of deployable microservices corresponding to the plurality of candidate microservices.

The isolating may include determining that one or more software functions of a given one of the plurality of software classes are used by other software classes from at least two different ones of the plurality of candidate microservices; and creating, for each of the at least two different candidate microservices, a respective new software class comprising at least a portion of the one or more software functions associated with the corresponding one of the at least two different candidate microservices.

The creating may include at least one of: splitting at least one of the one or more software functions of the given software class between the respective new classes; and copying at least one of the one or more software functions of the given software class to one of the respective new classes. The determining may include tracing call dependency graphs corresponding to the monolith application. The identified one or more software functions comprise may include at least one of: at least one software function associated with one or more entry points of the monolith application; and at least one software function associated with one of the candidate microservices that is called by a different software function associated with a different one of the microservices. The analyzing may include identifying the one or more entry points based on at least one of a static analysis and a dynamic analysis of the monolith application. The converting may include generating a respective application programming interface signature for each of the identified one or more software functions based on a combination of a name of the software class comprising the given identified software function and a label assigned to the candidate microservice comprising the given identified software function. The one or more application programming interfaces may include representational state transfer rest application programming interfaces, and the converting may include: using the generated application programming interface signatures to convert the source code into the standardized application programming interface format. The standardized application programming interface format may include an open-source interface description language for describing the representational state transfer rest application programming interfaces. The converting may include mapping, for a given one of the identified software functions, at least one type of operation associated with the monolith application to at least one corresponding type of operation associated with a representational state transfer rest application programming interface; tracking modifications of non-primitive data associated with one or more arguments of the given one of the identified software functions based on a data flow analysis of the monolith application; and converting the non-primitive data to a data format corresponding to the representational state transfer rest application programming interface based at least in part on the tracking.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 7:
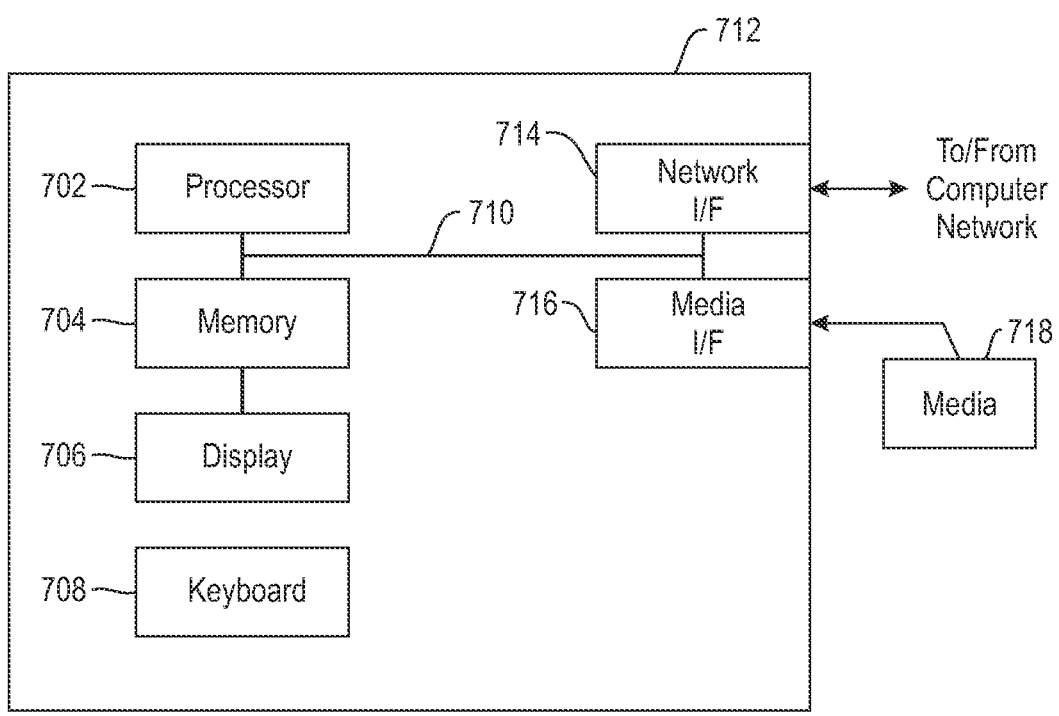
FIG. 7 is a system diagram of an exemplary computer system on which at least one embodiment of the present disclosure can be implemented.

Additionally, an embodiment of the present invention can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
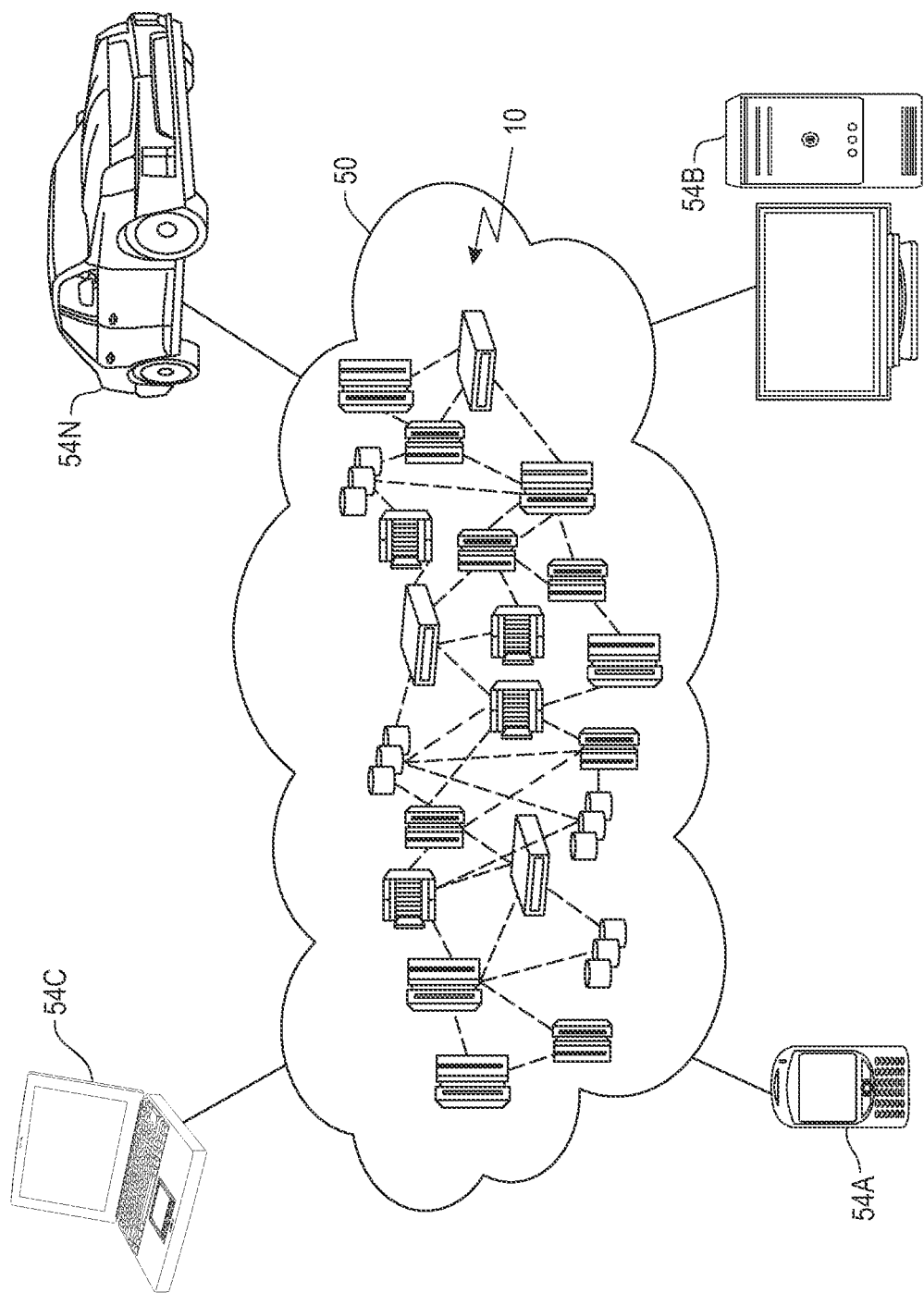
FIG. 8 depicts a cloud computing environment according to an embodiment of the present disclosure.

Referring now to FIG. 8, illustrative cloud computing environment 50 is depicted. As shown, cloud computing environment 50 includes one or more cloud computing nodes 10 with which local computing devices used by cloud consumers, such as, e.g., personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
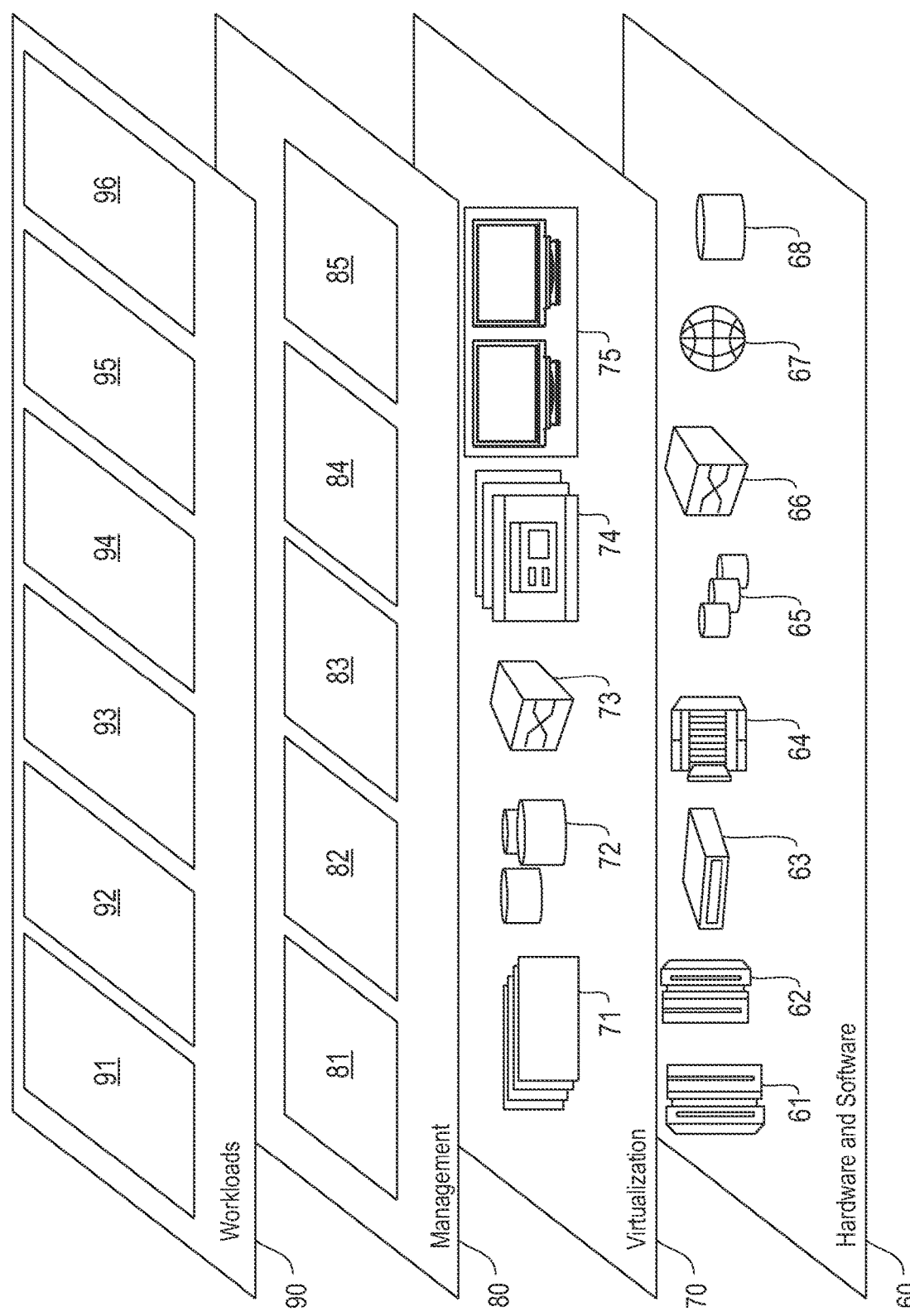
FIG. 9 depicts abstraction model layers according to an embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and translating clusters of a monolith application to microservices 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide beneficial effects including, for example, one or more of modernizing applications by automatically translating clusters of candidate microservices into deployable microservices. Additionally, one or more embodiments provide a beneficial effect of reducing dependency between microservices by moving code blocks from one candidate microservice to a more relevant microservice.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
   obtaining a plurality of candidate microservices for refactoring a monolith application, each candidate microservice comprising one or more of a plurality of software classes of the monolith application;
   analyzing the monolith application to identify one or more software functions in the plurality of software classes to expose as one or more application programming interfaces;
   automatically isolating non-overlapping software functions of the monolith application between the plurality of candidate microservices, wherein the isolating comprises: determining that one or more software functions of a given one of the plurality of software classes are used by other software classes from at least two different ones of the plurality of candidate microservices; and creating, for each of the at least two different candidate microservices, a respective additional software class comprising at least a portion of the one or more software functions associated with the corresponding one of the at least two different candidate microservices;
   converting source code corresponding to the identified one or more software functions into a standardized application programming interface format based at least in part on the isolating; and
   using the converted source code to generate a plurality of deployable microservices corresponding to the plurality of candidate microservices;
   wherein the method is carried out by at least one computing device.

2. The computer-implemented method of the computer-implemented method of wherein the creating comprises at least one of:
   splitting at least one of the one or more software functions of the given software class between the respective additional software classes;
   and copying at least one of the one or more software functions of the given software class to one of the respective additional software classes.

3. The computer-implemented method of claim 1, wherein the determining comprises:
   tracing call dependency graphs corresponding to the monolith application.

4. The computer-implemented method of claim 1, wherein the identified one or more software functions comprise at least one of:
   at least one software function associated with one or more entry points of the monolith application; and
   at least one software function associated with one of the candidate microservices that is called by a different software function associated with a different one of the microservices.

5. The computer-implemented method of claim 4, wherein the analyzing comprises:
   identifying the one or more entry points based on at least one of a static analysis and a dynamic analysis of the monolith application.

6. The computer-implemented method of claim 4, wherein the converting comprises:
   generating a respective application programming interface signature for each of the identified one or more software functions based on a combination of a name of the software class comprising the given identified software function and a label assigned to the candidate microservice comprising the given identified software function.

7. The computer-implemented method of claim 6, wherein the one or more application programming interfaces comprise representational state transfer rest application programming interfaces, and wherein the converting comprises:
   using the generated application programming interface signatures to convert the source code into the standardized application programming interface format.

8. The computer-implemented method of claim 7, wherein the standardized application programming interface format comprises an open-source interface description language for describing the representational state transfer rest application programming interfaces.

9. The computer-implemented method of claim 1, wherein the converting comprises:
   mapping, for a given one of the identified software functions, at least one type of operation associated with the monolith application to at least one corresponding type of operation associated with a representational state transfer rest application programming interface;
   tracking modifications of non-primitive data associated with one or more arguments of the given one of the identified software functions based on a data flow analysis of the monolith application; and
   converting the non-primitive data to a data format corresponding to the representational state transfer rest application programming interface based at least in part on the tracking.

10. The computer-implemented method of claim 1, wherein software is provided as a service in a cloud environment.

11. A computer program product comprising a computer readable storage medium having program instructions embodied therewith, the program instructions executable by a computing device to cause the computing device to:
obtain a plurality of candidate microservices for refactoring a monolith application, each candidate microservice comprising one or more of a plurality of software classes of the monolith application;
analyze the monolith application to identify one or more software functions in the plurality of software classes to expose as one or more application programming interfaces;
automatically isolate non-overlapping software functions of the monolith application between the plurality of candidate microservices, wherein the isolating comprises: determining that one or more software functions of a given one of the plurality of software classes are used by other software classes from at least two different ones of the plurality of candidate microservices; and creating, for each of the at least two different candidate microservices, a respective additional software class comprising at least a portion of the one or more software functions associated with the corresponding one of the at least two different candidate microservices;
convert source code corresponding to the identified one or more software functions into a standardized application programming interface format based at least in part on the isolating; and
use the converted source code to generate a plurality of deployable microservices corresponding to the plurality of candidate microservices.

12. The computer program product of claim 11, wherein the creating comprises at least one of:
splitting at least one of the one or more software functions of the given software class between the respective additional software classes; and
copying at least one of the one or more software functions of the given software class to one of the respective additional software classes.

13. The computer program product of claim 11, wherein the determining comprises:
tracing call dependency graphs corresponding to the monolith application.

14. The computer program product of claim 11, wherein the identified one or more software functions comprise at least one of:
at least one software function associated with one or more entry points of the monolith application; and
at least one software function associated with one of the candidate microservices that is called by a different software function associated with a different one of the microservices.

15. The computer program product of claim 14, wherein the analyzing comprises:
identifying the one or more entry points based on at least one of a static analysis and a dynamic analysis of the monolith application.

16. The computer program product of claim 14, wherein the converting comprises:
generating a respective application programming interface signature for each of the identified one or more software functions based on a combination of a name of the software class comprising the given identified software function and a label assigned to the candidate microservice comprising the given identified software function.

17. The computer program product of claim 16, wherein the one or more application programming interfaces comprise representational state transfer rest application programming interfaces, and wherein the converting comprises:
using the generated application programming interface signatures to convert the source code into the standardized application programming interface format.

18. A system comprising:
a memory configured to store program instructions;
a processor operatively coupled to the memory to execute the program instructions to:
obtain a plurality of candidate microservices for refactoring a monolith application, each candidate microservice comprising one or more of a plurality of software classes of the monolith application;
analyze the monolith application to identify one or more software functions in the plurality of software classes to expose as one or more application programming interfaces;
automatically isolate non-overlapping software functions of the monolith application between the plurality of candidate microservices, wherein the isolating comprises: determining that one or more software functions of a given one of the plurality of software classes are used by other software classes from at least two different ones of the plurality of candidate microservices; and creating, for each of the at least two different candidate microservices, a respective additional software class comprising at least a portion of the one or more software functions associated with the corresponding one of the at least two different candidate microservices;
convert source code corresponding to the identified one or more software functions into a standardized application programming interface format based at least in part on the isolating; and
use the converted source code to generate a plurality of deployable microservices corresponding to the plurality of candidate microservices.

19. The system of claim 18, wherein the identified one or more software functions comprise at least one of:
at least one software function associated with one or more entry points of the monolith application; and
at least one software function associated with one of the candidate microservices that is called by a different software function associated with a different one of the microservices.

20. A computer-implemented method, the method comprising:
obtaining a plurality of candidate microservices for refactoring a monolith application, each candidate microservice comprising one or more of a plurality of software classes of the monolith application;
analyzing the monolith application to identify one or more software functions in the plurality of software classes to expose as one or more application programming interfaces;
automatically isolating non-overlapping software functions of the monolith application between the plurality of candidate microservices;
converting source code corresponding to the identified one or more software functions into a standardized application programming interface format based at least in part on the isolating, wherein the converting comprises: mapping, for a given one of the identified software functions, at least one type of operation associated with the monolith application to at least one corresponding type of operation associated with a representational state transfer rest application programming interface; tracking modifications of non-primitive data associated with one or more arguments of the given one of the identified software functions based on a data flow analysis of the monolith application; and converting the non-primitive data to a data format corresponding to the representational state transfer rest application programming interface based at least in part on the tracking; and using the converted source code to generate a plurality of deployable microservices corresponding to the plurality of candidate microservices;

wherein the method is carried out by at least one computing device.

* * * * *